United States Patent [19]
Steckel et al.

[11] Patent Number: 5,996,534
[45] Date of Patent: *Dec. 7, 1999

[54] ANIMAL LITTER HAVING THE PROPERTY OF DETECTING URINARY INFECTION IN FELINES

[75] Inventors: Ralph J. Steckel, Plano; Edward Eugene Hodges, III, Trinidad; Herman Morris Weller, Ennis, all of Tex.

[73] Assignee: Pet Eceology Brands, Inc., Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,929

[22] Filed: Jun. 25, 1997

Related U.S. Application Data

[63] Continuation-in-part of application No. 08/678,240, Jul. 11, 1996, Pat. No. 5,655,480, and application No. 08/686,309, Jul. 25, 1996, abandoned.

[51] Int. Cl.$^6$ ....................................................... A01K 1/015
[52] U.S. Cl. .............................................................. 119/171
[58] Field of Search ..................................... 119/171, 172, 119/173

[56] References Cited

U.S. PATENT DOCUMENTS

| | | | |
|---|---|---|---|
| 5,207,830 | 5/1993 | Cowan et al. | 119/173 |
| 5,295,456 | 3/1994 | Lawson | 119/172 |
| 5,303,676 | 4/1994 | Lawson | 119/173 |
| 5,421,291 | 6/1995 | Lawson et al. | 119/173 |
| 5,655,480 | 8/1997 | Steckel | 119/171 |

*Primary Examiner*—Thomas Price
*Attorney, Agent, or Firm*—Gregory M. Howison

[57] ABSTRACT

An animal litter comprised of a liquid absorbent aggregate impregnated with a litmus agent for indicating a urinary tract infection in felines.

5 Claims, No Drawings

ANIMAL LITTER HAVING THE PROPERTY OF DETECTING URINARY INFECTION IN FELINES

CROSS REFERENCE TO RELATED APPLICATION

This is a continuation-in-part of U.S. application Ser. No. 08/678,240 filed Jul. 11, 1996 now U.S. Pat. No. 5,655,480 for ANIMAL CONTROL LITTER and a continuation-in-part of copending application Ser. No. 08/686,309 filed Jul. 25, 1996, now abandoned for ANIMAL LITTER HAVING THE PROPERTY OF DETECTING URINARY INFECTION IN CATS.

BACKGROUND OF THE INVENTION

1. Field of the Invention

This invention relates to an animal litter in which a liquid absorbent aggregate acts as a carrier of an agent for detecting urinary infection in felines and other related species.

2. Brief Description of Related Art

Because of the growing number of domestic animals, particularly felines, used as house pets, there is an increasing need for a simple means to inform the pet owner of the presence of urinary infections so that curative steps can be taken to avoid serious illness in the animal.

To the extent I am aware, the only procedure available today for detecting urinary infection in felines is to take the animal to a veterinarian who makes an appropriate test. The test usually involves the taking of a urine sample and testing it for the presence of infection. Felines are not always cooperative in the sample gathering procedure and therefore there is a need for a simple technique for determining the presence of urinary infection that avoids the need for obtaining urine samples.

It is an object of the present invention to provide an animal litter that is impregnated with an agent for indicating the presence of infection.

It is another object of the present invention to provide an animal litter containing an agent sensitive to the alkalinity of feline urine to indicate a measure of urinary infection.

It is a further object of the present invention to provide an animal litter that enables a pet owner to immediately determine the presence of a urinary infection without the need to take the animal to a veterinarian.

SUMMARY OF THE INVENTION

According to the present invention there is provided an animal litter comprised of a pH neutral or near neutral liquid absorbent aggregate that has been treated with an agent to visually indicate the presence of urinary infection in felines. The presence and the degree of infection is represented by the degree of alkalinity of the urine. Thus by impregnating the litter with a litmus-like material, such for example as sodium phenolsulfonephthalein, a pet owner can, by observing the coloration of clumped litter containing the urine, immediately determine whether or not the pet has a urinary infection. If so, the pet may then be taken to a veterinarian for treatment.

The litmus material is available from Merck under such names as Phenol Red, Sodium Golf or Reagent ACS Indicator. The litmus material, available in granule form may be finely ground into a powder and well mixed with the liquid absorbent aggregate to coat the surfaces of the aggregate granules. Preferably the litmus granules are melted at temperatures about 212 Degrees F. to form a liquid which is sprayed upon the aggregate.

The preferred litter is that described and claimed in co-pending application Serial # (Attorneys docket P104-002) filed Jul. 11, 1996 for Animal Control Litter.

DESCRIPTION OF THE PREFERRED EMBODIMENT

The animal litter of the present invention is a composition comprised of a liquid absorbent aggregate impregnated with an agent for detecting urinary tract infection in cats. The agent is a litmus material which reacts to the alkalinity of the feline urine to change the color of the litter where the feline has voided to indicate to the pet owner the presence and degree of a urinary tract infection. The litmus material possesses an activity range from pH 6.6 to pH 8.0 as provided by, but not limited to, sodium phenolsulfonephthalein available from Merck under such names an Phenol Red, Sodium Golf or Reagent ACS Indicator.

The litmus agent or material, available in granular form may be finely ground into a powder and well mixed with the liquid absorbent aggregate to coat the surfaces of the aggregate granules. Preferably the litmus granules are melted at temperatures of about 212 degrees F. to form a liquid which is sprayed upon the aggregate to coat the surfaces of the granules.

The litmus coated granules react to the alkalinity pH of the feline urine to change color to indicate the presence and the severity of a urinary tract infection. The multiple color changes related to the pH of the urine is as follows:

pH factor of 6.8, color is yellow pH factor of 7.0, color is pink pH factor of 7.5, color is red pH factor of 8.0, color is blood red All colors indicate the presence of a urinary tract infection. Should the blood red color be observed the pet owner should immediately take steps to cure the condition. In fact the presence of any of the colors should give rise to visit a veterinarian for treatment to the animal.

The preferred litter is that described and claimed in co-pending application Serial# (Attorney Docket P104-002) filed Jul. 11, 1996 for Animal Control. The preferred litter incorporating features of the present invention comprises an expanded light weight aggregate, a clamping agent, a surfactant, a pH neutral or near neutral anti-static agent and an odor control agent. The composition is dust free, light weight and biodegradable and does not bio-accumulate. When the time comes a bio-clumped mass is scooped from the dry litter and flushed down the commode.

The light weight aggregate is selected from, but not limited to, the class consisting of perlite, vermiculite, herculite, rice hulls and zeolite. Perlite is the preferred aggregate. It may initially be obtained from Harborlite Corporation, 1950 East "W" Ave, Vicksburg, Mich. 49097-0100 in grade (−6+16 millimeters). The perlite is then expanded to provide porous surfaces by heating the perlite to 1800 degrees F.

The clumping agent is a polymeric viscosity modifier, such as, but not limited to AgRho DR-2000 available from Rhone-Poulenc, prospect Plains Road, Cranbury, N.J. 08517600. In order to enable the litter composition to agglomerate into a mass upon contact with animal urine the clumping agent is mixed with the litter composition, preferably in an amount ranging from about 1 percent to about 10 percent by weight of the litter composition.

The surfactant, preferably, is an alkylphenol ethoxylate sold under the trade name CHEMPRO S-100 by Chemorse, Ltd. of 4685 Merie Hay Road, Des Moines, Iowa 50322. The surfactant adds the property of anti-tracking to the composition thus preventing the carrying of portions of the composition from the litter box to other areas of the household.

Also included is an antistatic agent. The antistatic agent (antistat) is a non-ionic ester or amine such as glycerol esters of fatty acids. The amines are commonly ethoxylated tertiary amines. Dehydrate 20, 21 and 22 from Henkel 300 Brookside Ave., Ambler, Pa. 19002 are antistats that fall into these categories. The general mechanism of antistats is that of migration to the surface of the aggregate and the subsequent hydrophilic attraction of a thin film of moisture thereon. This increases the surface conductivity, thereby lowering the resistivity and tracking due to static electricity.

The odor control agent is proprietary to the supplier who maintains it as a trade secret. It is available under the tradename D-ODOR from Envio Care America, Inc. having a mailing address of P.O. Box 1284, Ennis, Tex. 75120-1284. The odor control agent ranges in color from yellow to gray to white. It is available scent free as well as with various odor mask combinations including but not limited to a fresh baby powder scent, an industrial peppermint scent and a citrus scent. The odor control agent performs the function of odor elimination by blocking odor producing oxidation of decomposing organic matter and by complexing airborne odor molecules. It performs the function of odor elimination, not as a coverup, but in the prevention of the formation of the ammoniacal odors.

A formulations of the animal control litter of the present invention are as follows:

- 89.1 percent ±5.0 percent by weight of expanded aggregate
- 00.4 percent ±0.4 percent by weight of odor control agent
- 07.0 percent ±4.0 percent by weight of clumping agent
- 03.0 percent ±2.5 percent by weight of surfactant
- 00.5 percent ±0.4 percent by weight of litmus agent
- 00.5 percent ±0.4 percent by weight of antistat A preferred composition is as follows:

- 89.1 percent by weight of expanded aggregate
- 00.4 percent by weight of D-Odor
- 07.0 percent by weight of clumping agent
- 03.0 percent by weight of surfactant
- 00.5 percent by weight of sodium phenolsulfonephthalein
- 00.5 percent by weight of Dehydrate 20,21 or 22

The composition is prepared by mixing the above components in sufficient quantity to make 100 percent in apparatus which causes the odor control agent, the surfactant and the clumping agent to enter and to fill the pores in the expanded aggregate. The apparatus provides multiple folds per revolution in the mixing. A suitable apparatus is a Continental Roto Mixer, Model V5, drum type roto. It rotates at 4 RPM. Every revolution provides 6 folds in the mixing action to assure that each particle of expanded aggregate is uniformly coated.

The indication (litmus) solution is prepared by dissolving the proper amount of the indicator in a proprietary solvent mixture with mechanical shear. After dissolution is complete, the pH of the solution is adjusted so as to ensure that the resulting solution exhibits the lower range of the indicator. This solution, when applied to the feline litter, results in a yellow tinted material.

The composition is packaged or shipment in sealed bags which have been placed in cardboard shipping containers or pails so that the vibrations encountered in shipping do not cause the components to separate or to dry out any component.

Now that the invention has been described, modifications will occur to those skilled in the art and it is intended to cover such modifications which fall within the scope of the appended claims.

What is claimed is:

1. Animal litter comprised of a liquid absorbent aggregate having a substantially neutral pH and impregnated with a litmus agent to indicate the presence of urinary tract infection in felines and other related species.

2. The animal litter of claim 1 in which the liquid absorbent aggregate includes an expanded aggregate selected from the class consisting of perlite, vermiculite, herculite, rice hulls and zeolite.

3. The animal litter of claim 2 in which the aggregate has a substantially neutral pH and requires no inert carrier or pH neutralizing agent to maintain the animal litter's pH indicating properties.

4. The animal litter of claim 1 in which the litmus agent is a pH agent with an approximate activity range from pH 6.6 to pH 8.0 such as, but not limited to, sodium phenolsulfonephthalein.

5. The animal control litter of claim 3 in which the odor control agent is D-ODOR, the surfactant is an alkylphenol ethoxylate, the clumping agent is AgRho DR-2000 and the litmus material is a sodium phenolsulfonephthalein.

* * * * *